April 22, 1941.  W. SLEPICA  2,239,404

FISH LURE

Filed July 28, 1939

INVENTOR.
William Slepica
BY
ATTORNEYS.

Patented Apr. 22, 1941

2,239,404

UNITED STATES PATENT OFFICE 2,239,404

FISH LURE

William Slepica, Seattle, Wash.

Application July 28, 1939, Serial No. 287,155

4 Claims. (Cl. 43—46)

This invention relates to fish lures and especially to that class of lure, commonly referred to as plugs, which are intended to simulate the appearance and the action of minnows and the like upon which the larger game fish such, for example, as salmon and bass feed. The common practice with this type of lure is to rig the same with two sets of gang-hooks, one suspended from the tail portion and the other from the belly portion of the plug body.

A principal object of the present invention is to improve the manner of rigging the plug for eliminating weaknesses inherent in substantially all prior plugs, and it is a further and particular object to produce an advanced design which adapts itself most effectively to the advanced rigging for obtaining, in the travel of the lure through the water, an action suggestive of the movements of a minnow, and especially a wounded minnow, more realistically than heretofore.

The novel features peculiar to my invention and by means of which the foregoing broadly recited objects are attained will appear in the course of the following description and claims, the invention consisting in the novel form and in the adaptation and arrangement of the parts hereinafter described and claimed.

Figure 1:
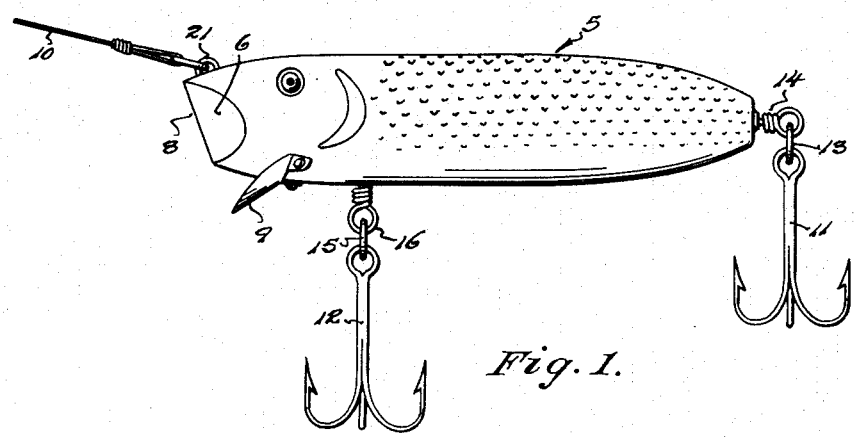
Figure 1 is a side elevational view illustrating a fish lure constructed in accordance with the present invention.
Figure 2:
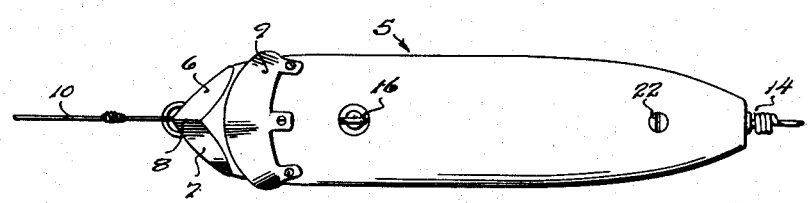
Fig. 2 is an underside plan view thereof with the gang-hooks detached.
Figure 3:
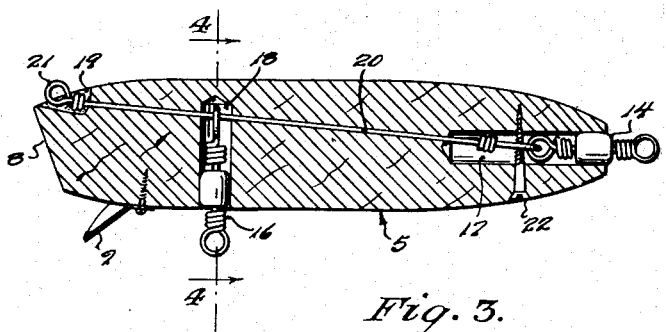
Fig. 3 is a longitudinal vertical section on the median line of the plug, also with the hooks detached.
Figure 4:
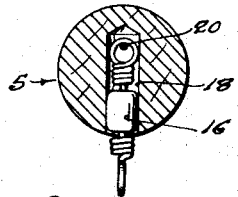
Fig. 4 is a transverse vertical section on line 4—4 of Fig. 3.

The lure itself, denoted generally by the numeral 5, is desirably produced from wood or other buoyant material shaped to a substantially cylindrical form for the greater part of its length with the tail portion tapered. The front or head end is likewise given a taper and is relatively blunt with facing cheeks 6—7 sloping laterally from each side of a median nose 8, the nose being porbeagled in that I slightly undercut the same. Below the flaring head is a metal lip 9 of a width approximating the diameter of the body and of a length to have the forwardly inclined tip lie on or proximate to a prolongation of the rectilineal line of the nose. While these described surface characteristics of the plug, when employed with a line, as 10, which engages the plug immediately above the upper limits of the nose, are found to promote the efficiency of the plug as a fish lure, it will of course be apparent that other shapes of plug bodies might, with satisfactory results, be employed in conjunction with the hereinafter described rigging.

Referring now to the rigging by which the two gang-hooks denoted by 11 and 12 are applied to the lure, the former of these hooks being conventionally hung by a ring 13 from one eye of an ordinary swivel 14 and the other gang-hook by a ring 15 from the eye of a swivel 16, it will be seen that I provide, as a socket for the rear swivel, a horizontal bore 17 in the tail portion of the body and, as a socket for the front swivel, a vertical bore 18 in the belly part of the body, the latter bore traversing a longitudinal hole which is drilled diagonally through the body from the rear socket to a cavity 19 which lies above the nose of the plug. Fitting this drilled hole and inserted from the rear of the plug with its terminal end attached to the forward eye of the rear swivel is a wire snood 20, the snood, following insertion, having its forward terminus turned upon itself to produce a line tie 21. The shank of this snood, in its traversal of the vertical bore, is caused to pass through the upper eye of the forward swivel 16. 22 indicates a screw which desirably is threaded in the plug to pass through the swivel tie at the rear end of the snood for securing the latter against longitudinal shifting movements relative to the plug body.

The described rigging, in a manner which is believed to be apparent, operates to transmit stresses from either of the gang-hooks to the snood and therefrom directly to the line, an arrangement which precludes loss of a hooked fish due to the splitting of the plug and, moreover, minimizes the tendency to develop a split under the twisting stress of a strike due to the swiveled suspension of the hooks.

What I claim, is:

1. In a fish lure, in combination, a plug body having a vertical bore in the belly portion and a horizontal bore in the tail portion, a wire snood carried in traversing relation to said belly bore diagonally through the body of the plug from the tail bore to the upper limits of the head and providing a line tie at its forward end, a hook-carrying swivel fitted in the tail bore and engaging the rear end of the snood, and a hook-carrying swivel fitted in the belly bore and characterized in that the same provides an eye at each end of which the upper eye receives the snood therethrough and the lower eye engages the hook.

2. In a fish lure, in combination, a plug body having a vertical bore in the belly portion, a wire snood carried in traversing relation to said belly bore longitudinally through the body of the plug and providing a line tie at its forward end and an eye at its rear end, a hook-engaging swivel connected with said eye of the snood, and a hook-engaging swivel fitted in the belly bore and characterized in that the same provides an eye at each end of which the upper eye receives the snood therethrough and the lower eye engages the hook.

3. The defined fish lure of claim 2 having a screw working in the plug body and passing through the eye of the snood for securing the snood against shifting movements relative to the body.

4. In a fish lure, in combination, a plug body having the tail and belly portions bored to provide cylindrical sockets, swivels providing a central barrel part produced to a diameter corresponding to the diameter of the body sockets and fitting in the latter, said swivels having an eye at each end and in their application to the sockets locating one of said eyes within the body of the plug and the other eye externally of the latter, means common to both of said swivels projected through the body of the plug and engaging the plug-housed eye of both swivels for securing the swivels to the plug, and hooks suspended from the exposed eye of each of the swivels.

WILLIAM SLEPICA.